(12) United States Patent
Tareen et al.

(10) Patent No.: US 8,594,854 B1
(45) Date of Patent: Nov. 26, 2013

(54) POWER SHARING GROUP FORMATION

(75) Inventors: Ali Ahmad Tareen, Milpitas, CA (US);
John R. Hupton, San Jose, CA (US);
Minli Lin, Saratoga, CA (US); Krishna Kumar Vavilala, Cedar Park, TX (US)

(73) Assignee: Cisco Technology, Inc., San Jose, CA (US)

( * ) Notice: Subject to any disclaimer, the term of this patent is extended or adjusted under 35 U.S.C. 154(b) by 291 days.

(21) Appl. No.: 13/048,710

(22) Filed: Mar. 15, 2011

(51) Int. Cl.
*G05D 3/12* (2006.01)
*G05D 5/00* (2006.01)
*G05D 9/00* (2006.01)
*G05D 11/00* (2006.01)
*G05D 17/00* (2006.01)
*G05B 11/01* (2006.01)
*G06F 1/00* (2006.01)

(52) U.S. Cl.
USPC ............ 700/295; 700/22; 700/286; 700/291; 700/297; 713/300; 713/321; 713/340

(58) Field of Classification Search
USPC .......................... 700/22, 286, 291, 295, 297; 713/300–340
See application file for complete search history.

(56) References Cited

U.S. PATENT DOCUMENTS

| | | | | |
|---|---|---|---|---|
| 5,845,150 A * | 12/1998 | Henion | ............................ | 710/19 |
| 5,990,570 A * | 11/1999 | Yoshida et al. | .............. | 307/10.1 |
| 6,115,713 A * | 9/2000 | Pascucci et al. | ....................... | 1/1 |
| 6,157,091 A * | 12/2000 | Yoshida et al. | .............. | 307/10.1 |
| 6,330,231 B1 * | 12/2001 | Bi | ................................. | 370/328 |
| 7,293,182 B2 * | 11/2007 | Diab et al. | ..................... | 713/300 |
| 7,485,986 B2 * | 2/2009 | Menas et al. | ..................... | 307/38 |
| 7,636,615 B2 * | 12/2009 | Pfingsten et al. | ............. | 700/286 |
| 7,982,336 B2 * | 7/2011 | Hiscock et al. | ................. | 307/29 |
| 8,276,010 B2 * | 9/2012 | Vavilala et al. | ................. | 713/320 |
| 2010/0205471 A1 * | 8/2010 | Vavilala et al. | ............... | 713/340 |
| 2010/0207449 A1 | 8/2010 | Hiscock et al. | | |
| 2011/0016333 A1 * | 1/2011 | Scott et al. | ..................... | 713/300 |

* cited by examiner

*Primary Examiner* — Ramesh Patel
(74) *Attorney, Agent, or Firm* — Tucker Ellis LLP (57) ABSTRACT

In accordance with an example embodiment, there is disclosed herein a technique for the formation of power sharing groups by a power supply module. The power supply module sends a discovery message and eventually receives the discovery message back. The power supply message also receives a discovery message from at least one other power supply module. The power supply module determines whether it is a master of the group, and if the power supply module is the master of the group, the power supply module determines power budgets for the at least one other power supply module. After obtaining a power supply budget, a controllable switching device is closed enabling power to be shared with the at least one other power supply module.

25 Claims, 6 Drawing Sheets

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Major Version 702 ||| Minor Version 704 |||| Message Type 706 ||||||||
| PS1 708 | PS2 710 | S 712 | J 714 | N 716 | M 718 | C 720 || E 722 | R 724 | Res. 726 | Res. 726 | Res. 726 | Res. 726 | Res. 726 | Res. 726 |
| Length 728 |||||||| Sequence Number 730 ||||||||
| Source Mac Address 732 ||||||||||||||||
| Source Mac Address (Continued) ||||||||||||||||
| Source Mac Address (Continued) ||||||||||||||||
| Destination Mac Address 734 ||||||||||||||||
| Destination Mac Address (Continued) ||||||||||||||||
| Destination Mac Address (Continued) ||||||||||||||||
| PS1 Power Capacity 736 |||||||| PS2 Power Capacity 738 ||||||||
| Payload 740 |||||||| Payload ||||||||
| Checksum ||||||||||||||||

POWER SHARING GROUP FORMATION

TECHNICAL FIELD

The present disclosure relates generally to power supplies capable of being configured to share power with other power supplies in a group.

BACKGROUND

A power sharing group enables load sharing of Front End Power ("FEP") supplies across multiple systems. A power sharing group could be visualized as power supplies from individual switches joining together to form one larger power supply that supplies power to the individual switches and the powered devices ("PDs") connected to them.

BRIEF DESCRIPTION OF THE DRAWINGS

The accompanying drawings incorporated herein and forming a part of the specification illustrate the example embodiments.

OVERVIEW OF EXAMPLE EMBODIMENTS

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein an apparatus comprising at least one powered port configured to provide power to a powered device, a data interface for communicating with at least one other power supply module in a power sharing group, a power sharing interface for sharing power with the at least one other power supply module, the power sharing interface comprising a controllable switching device, and a controller coupled with the data interface and power sharing interface. The controller sends and receives discovery messages with the at least one other power supply via the data interface. The controller obtains data representative of a power budget and closes the controllable switching in the power sharing interface to share power with the at least one other power supply module responsive to obtaining the power budget. The controller enters a state where power is shared with the at least one other power supply module belonging in the power sharing group. The power being shared is used to provide power to any powered devices coupled with the at least one port.

In accordance with an example embodiment, there is disclosed herein a method comprising sending a discovery message, receiving the discovery message, and receiving a discovery message from at least one other power supply module. The method further comprises determining whether to enter a master declaration state, obtaining a power budget, and closing a controllable switching device coupled with a first power sharing interface to share power with at least one other power supply module responsive to obtaining the power budget.

In accordance with an example embodiment, there is disclosed herein logic encoded in a non-transitory computer readable storage medium for execution by a processor, and when executed operable to send a discovery message, receive the discovery message, receive a discovery message from at least one other power supply module, and determine whether to enter a master declaration state. The logic is further operable to obtain a power budget and close a controllable switching device coupled with a first power sharing interface to share power with at least one other power supply module responsive to obtaining the power budget.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at last one embodiment described herein and does not imply that the feature, structure, or characteristic is present in all embodiments described herein.

In an example embodiment, there is described herein a power sharing group formation process that can be divided into four states. The four states are 1) a discovery state; 2) a master declaration state; 3) a power budget state; and 4) a ready state.

In the discovery state, switches in a group sends out a discovery message to its neighboring switches. In an example embodiment, the discovery messages are sent through a Universal Asynchronous Receiver-Transmitter ("UART") interface's software communication bus. After receiving the discovery message back (or messages if there are multiple UARTs), the switch starts a timer (a discovery done timer) to obtain data about neighboring switches in the group. After the timer expires, the members of the group determine a master of the group. In an example embodiment, the following criteria may be employed:

1. The switch with a default master configuration should be the master;
2. If there is an existing master, it remains the master; or
3. If no master, the switch with the lowest (or highest) Media Access Control ("MAC") address.

The master switch enters the master declaration. Only master will enter this state.

In the master declaration state, the master will declare itself the master by turning its master bit ON. This will notify the other switches in the group who is the power group master. The master will exit the master declaration state after sending and receiving two messages (one message would be sent out from each data (e.g., UART) interface). If in the master declaration state, a switch joins the group that has a lower MAC address than the master (hence has a higher priority to be a master) then the master will yield and let the new switch declare itself the master. The old master will yield by turning OFF the master bit in the next group message. Moreover, if there is a group merge then the new master will also enter the master declaration state.

When the master leaves the master declaration state and enters the "power budget state", it will force the other switches to enter the power budget state as well. In this state the master provides the power budget to the individual switches. When a group power application gets the power budget then it will set the group power interrupt bit so that a group power application on the Internetwork Operating System ("IOS") can obtain the power budget and the master's MAC address. The transition to this state will happen either from a discovery state or a master declaration state. The individual switches will enter this state from the discovery state while the master will enter this state from the master declaration state.

In the ready state, switches continually monitor for certain events. In an example embodiment, switches monitor for the removal and/or insertion of powered devices to either adjust the power budget of individual switches and/or to inform the master that a power supply has been added or removed. In an example embodiment, switches monitor for the insertion and/or removal of power sharing cables. In particular embodiments, the insertion and/or removal of a power sharing cable trigger the system to return to the discovery state and repeat the master selection process. In an example embodiment, switches send out keep alive (or heartbeat) messages to advertise that the group power sharing process is running to other members of the group.

In an example embodiment, a power sharing port has an associated Bidirectional Current Sensing Disconnect Switch ("BCSDS") for sharing current when the BDSDS is closed. The decision to close the BCSDS is made by switches at the ends of the power sharing cable. In an example embodiment, the decision to close the switch is made within a predefined time period (e.g. within a timer tick, for example 10 milliseconds "ms"), and in particular embodiments there is a predefined delay period (for example 1 second) between closing of the BCSDSs of the individual switch units.

In an example embodiment, a three way handshake procedure is invoked to close the switches within a timer tick, which can allow software to allow threads to share processor time. A first switch sends a request (first message) to the second switch informing the second switch that the first switch wants to close its BCSDS. Upon receiving the first message, the second switch takes over the processor, disables interrupts and while sitting in a tight loop (e.g., suspends other threads), sends out a message (second message) to the first switch informing the first switch that the second switch is waiting for the switch to close. Upon receiving the second message, the first switch closes its BCSDS, which second switch detects, for example by observing a voltage change on the power cable, and the second switch closes its BCSDS in response to detecting that the first switch has closed its BCSDS.

In an example embodiment, once a three way handshake has started on a first power sharing port, a switch will not respond to any other requests received on other power sharing ports until the three way handshake has completed on the first power sharing port. An exception can be made if a switch on the other port has a lower MAC address than a neighboring switch. This can prevent an infinite loop in a ring environment where every switch in a ring environment is waiting on one port in the same direction around the ring to close.

In an example embodiment, before disabling interrupts and entering a tight loop, a power supply module will disable the interface (for example an Inter-integrated circuit ("I2C") interface between a micro controller unit "MCU" and an Internet Operating System "IOS") so that communication from the IOS will receive a Negative Acknowledgement ("NACK") response. This can prevent an IOS from declaring the power supply module is non-responsive because of its inability to communicate with threads on its MCU while the power sharing group formation protocol is running.

In an example embodiment, a power supply does not have an internal power supply (for example a switch is employed in a ring topology and is drawing power from another switch's power supply module on a power sharing interface). If the second port is connected to an Expandable Power System "XPS" (for example to form a power sharing group in a star topology with the XPS, where the XPS is the center of the start), the BCSDS on the second power sharing interface connected to the XPS is closed first before opening the BCSDS on the first power sharing interface.

Figure 1:
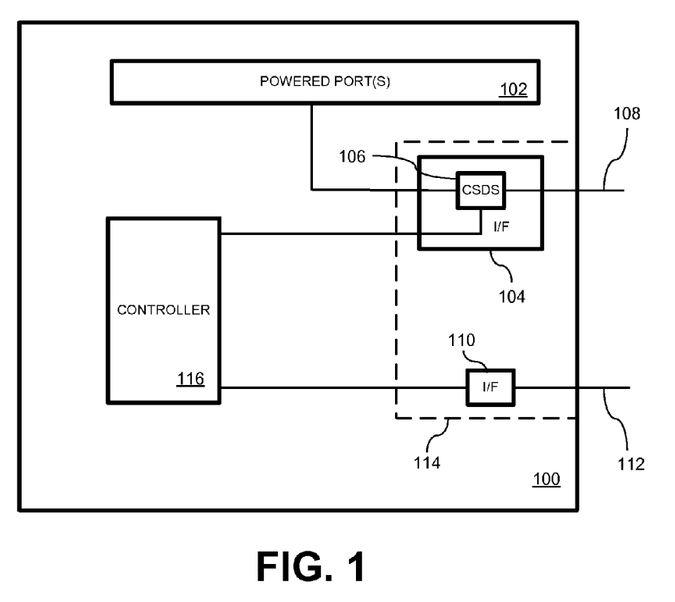
FIG. 1 is a block diagram illustrating an example of a power supply module for a power sharing group configured to provide power to at least one powered device, the power supply module having one power sharing interface and receives power for the powered device via the power sharing interface.

FIG. 1 is a block diagram illustrating an example of a power supply module 100 for a power supply module configured to provide power to at least one powered device via powered port 102. Power supply module 100 comprises one power sharing interface 104 and receives power for the powered device via the power sharing interface 104. In an example embodiment, power supply module 100 is part of a switch that is capable of providing power via Power over Ethernet ("POE" or "PoE") and/or Power over Ethernet Plus ("PoE+"). In an embodiment where power supply module 100 is part of a switch, power requirements for power supply module 100 may further include switch circuitry (not shown).

In the illustrated example, power supply module 100 comprises at least one powered port 102 that provides power to powered devices. In an example embodiment, the at least one powered port 102 is capable of providing power via Power over Ethernet ("POE" or "PoE") and/or Power over Ethernet Plus ("PoE+"). The power sharing interface 104 is provided to share power with at least one additional power supply. The power sharing interface 104 may suitably comprise the controllable switching device 106 such as a current sensing disconnect switch ("CSDS"). In particular embodiments, CSDS 106 is a bidirectional current sensing disconnect switch ("BCSDS"). A field effect transistor (FET) may be employed to implement the controllable switching device 106. A connector 108 is employed to couple interface 104 to at least one additional power supply module. When the controllable switching device 106 is open, the connector 108 is isolated from the at least one powered port 102. When the controllable switching device 106 is closed, the connector 108 is coupled with the at least one powered port 102 and power from other power supply modules can be shared and employed to provide power to the at least one powered port 102.

A data interface 110 is employed to communicate with at least one other power supply module in a power sharing group. The data interface 110 can be employed to send and receive discovery messages, master declaration messages and/or power budget messages as described herein.

In an example embodiment, the power sharing interface 104 and the data interface 110 are part of a communication interface 114. In particular embodiments, a Universal Asynchronous Receiver/Transmitter ("UART") may be employed to implement the communication interface 114 that comprises the power sharing interface 104 and data sharing interface 110. In an example embodiment, the data interface 110 may be implemented on the UART's software communication bus.

The controller 116 controls the operation of the power supply module 100. For example the controller 116 may send/receive discovery, master declaration and/or power budget messages. In an example embodiment, a micro controller unit (MCU) is employed for implementing the controller 116. The controller 116 suitably comprises logic for performing the functionality described herein. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), system on a chip ("SoC"), programmable system on a chip ("PSOC"), a programmable/programmed logic device, memory device containing instructions, or the like, or combinational logic embodied in hardware. Logic may also be fully embodied as software stored on a non-transitory, tangible storage medium which performs a described function when executed by a processor. Logic may suitably comprise one or more modules configured to perform one or more functions.

In the example illustrated in FIG. 1, the power supply module 100 does not have an internal power supply. The power supply module 100 may receive residual power via the connection 112 from other power supply modules belonging to the group. The controller 116 can open and close the CSDS 106 to selectively provide power to the at least one powered port 102.

In an example embodiment, the controller 116 enters a discovery state. While in the discovery state, the controller 116 sends and receives discovery messages from at least one other power supply via the data interface 110. The controller 116 enters a power budget state where the controller 116 obtains data representative of a power budget. The controller 116 closes the controllable switching device 106 in the power sharing interface 104 to share power with the at least one other power supply module responsive to obtaining the power budget. After closing the controllable switching device 106, the controller 116 enters a ready state. While in the ready state, the controller 116 monitors for predefined events and sends a heartbeat message at predefined intervals.

In an example embodiment, the controller 116 enters a master declaration state based on data obtained during the discovery state. In an example embodiment, the controller 116 enters the master declaration state if a media access control (MAC) address associated with power supply module 100 is the lowest (or highest) address among the members of the power sharing group. The controller 116 sends a master declaration to the at least one other power supply via the data interface. In addition, the controller 116 calculates a power budget for members (power supply module) of the group. The controller 116 sends a unicast power budget message to members of the power sharing group. The controller 116 transitions to the power budget state after sending a unicast power budget message to members of the power sharing group.

In an example embodiment, while in the declaration state, the controller 116 determines a priority for the powered ports (for example PoE or PoE+ports) associated with members of the power sharing group, for example the at least one powered port 102. In addition, members of the group can be assigned a priority. For example, the priorities of the powered ports may have been pre-set and can be communicated to the controller 116 in discovery messages. In an embodiment where port priorities have not been assigned, the controller 116 assigns the priorities for the powered ports. In an example embodiment, the default setting for powered ports 102 is high priority. For example, powered devices may be assigned a priority such as high priority and low priority, and switches in the group may also be assigned a priority. The priority assignments may be employed in the case of failure of a power supply module within a group to select loads to shed.

In an example embodiment, where a user has not set priorities, then the priority is determined by the following:

1) The first nine priorities are given to the systems based on their MAC address, that is the highest priority (priority #1) is given to the system with lowest MAC address and then in ascending MAC address order the priority is given to the other power supply modules;

2) The next nine priority levels will be assigned to high priority POE devices on the group. For example, the next highest priority (priority #10) will be assigned to the high priority POE devices of the system with the lowest MAC address and the in ascending order of the system MAC addresses, the priorities are assigned to the remaining high priority POE devices;

3) The remaining priority levels to the low priority POE devices.

In an example embodiment, a three way handshake is employed to communicate with a power supply module coupled with the power sharing interface 104 when the controller 116 is ready to close the controllable switching device 106 to share power. If the controller 116 is initiating the closing, the controller 116 sends a request message to a power supply module coupled with the power sharing interface 104. The request message containing data indicating that the controllable switching device is about to close. The request message may be sent via the data interface 110. The controller 116 waits for a response message from the power supply module coupled with the power sharing interface 104. The response message comprises data indicating that the power supply module coupled with the power sharing interface 104 is waiting for controllable switching device to close. The response message may be received on the data interface 110. The controller 116 closes the controllable switching device 106 in response to receiving the response message.

In an example embodiment, the closing of the controllable switching device 106 to share power may be initiated by a power supply module (not shown) coupled to the power sharing interface 104. The controller 116 receives a message indicating the power supply module coupled with interface 104 indicating that the power supply module is ready to share power. The message may be received via the interface 110. The controller 116 sends a response to the message indicating a readiness to share power at interface 104. Power supply module 100 waits for a voltage change at interface 104. The voltage indicates that the power supply module coupled with the power sharing interface 104 has closed the switch at its power sharing interface. Upon detecting the voltage change, the controller 116 closes controllable switching device 104.

In an example embodiment, the controller 116 controller monitors for removal and/or insertion of a power devices in the power sharing group. If power supply module 100 is the master for the power sharing group, the controller 116 adjusts the power budget for members of the power sharing group and communicates the adjusted budget to the members of the group. If power supply module 100 is not the master, controller communicates detecting the insertion and/or removal of a powered device to the master power supply module.

In an example embodiment, the controller 116 monitors for the insertion and/or removal of a power sharing cable. The controller 116 returns to the discovery state responsive to detecting insertion and/or removal of a power sharing cable.

Figure 2:
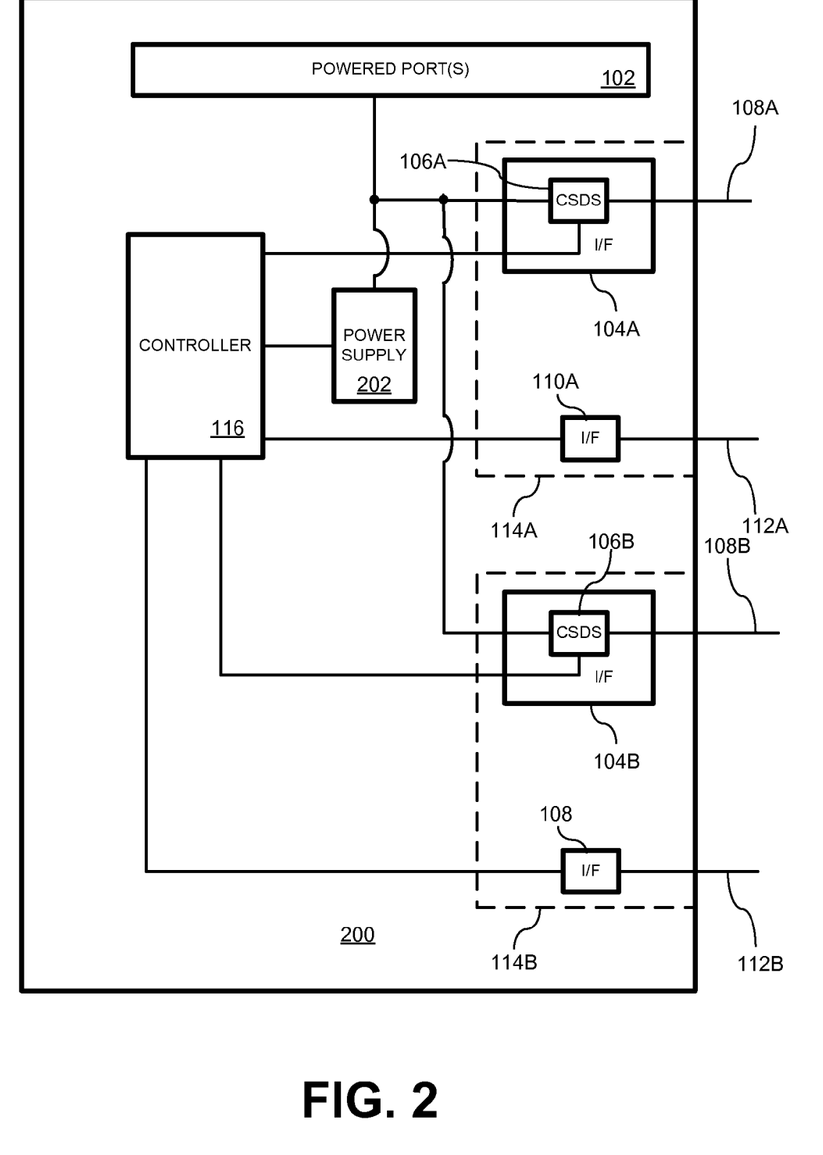
FIG. 2 is a block diagram illustrating an example of a power supply module for a power sharing group, the power supply module having two power sharing interfaces and an internal power supply.

In an example embodiment, the power supply module further comprises an internal power supply. FIG. 2 is a block diagram illustrating an example of a power supply module 200 with an internal power supply. The power supply module 200 comprises two power sharing interfaces 104A, 104B and an internal power supply 202. The illustrated example also has two communication interfaces (e.g., UARTs) 114A, 114B. Power from the power supply 202 is shared with other power supply modules in the power sharing group via either one or both of power sharing interfaces 104A, 104B. Power is shared via the interface 104A while the controllable switching device 106A is closed, and power is shared via the interface 104B while the controllable switching device 106B is closed.

During the discovery state, the controller 116 advertises a minimum power requirement inform the other members of the group and the power sharing group master about the power needed to keep the system running without the powered (e.g., POE) devices. For example, if power supply module 100 is part of a switch, the minimum power requirement is the power required to power the switching circuitry and the controller 116 but not power being provided to powered devices power via port 102. If the power supply module 200 is already running and joins a power sharing group at a later time then the minimum power requirement is the power needed to maintain steady state operation, for example:

> Minimum power requirement=Power needed to power up the system+total budgeted power (i.e. power given to the POE devices).

The power supply 202 may be employed as a backup or redundant power supply. The power supply 202 may switched off if power being provided (shared) from other power supply modules is sufficient to power powered devices coupled with the power sharing group, including powered devices coupled with powered port 102. Therefore, if the controller 116 obtains a power budget greater than or equal to the minimum power requirement, the controller 116 switches on the power supply 202; otherwise the power supply 202 may be turned off.

In an example embodiment, the controller 116 advertises a Maximum Power Requirement. The Maximum Power Requirement is advertised to inform the other members of the group and power sharing group master about the maximum power needed to supply uninterrupted power to power supply module 200 and POE devices coupled (e.g., POE devices coupled with at least one port 102) with power supply module 200. In an example embodiment, Maximum Power Requirement=Minimum Power Requirement+(number of POE ports)*maximum power needed by a POE powered device (for example 30 watts ("W") for POE+ and 15.4 W for POE).

In an example embodiment, a first universal asynchronous receive/transmit (UART) is employed to implement communication interface 104A comprising the first power sharing interface 106A and the first data interface 110A. A second UART is employed to implement second communication interface 104B comprising second power sharing interface 104B and the second data interface 110B.

In an example embodiment, the controller 116 prevents controllable switching devices 106A, 106B from controlling at the same time and/or within a predefined time period. Once one of controllable switching devices 106 or 106B begins a handshake to close, requests to close the other switch is denied until after the switch is closed with the exception of a power supply module this has a lower MAC address than both its neighbors.

If power supply module 200 is initiating the closing of the controllable switching device to begin sharing power with another power supply module in the group (not shown, see e.g., FIG. 4), a request is sent to the other power supply module with data indicating that power supply module is ready to close its controllable switching device (e.g., 106A or 106B) to share power with the other members of the group. Power supply module 200 waits for a response to the message indicating that the other power supply module is ready to close its switch and is waiting for power supply module 200 to close its switch. Power supply module 200 closes its switch responsive to receiving the response from the other power supply module. Once the other power supply module closes its controllable switching device, power supply module 200 and the other power supply are sharing power. The shared power is employed to provide power to powered devices coupled with the at least one powered port 102, and may also be employed to provide power to powered devices coupled with the other power supply module.

If power supply module 200 is receives a request from another power supply module in the group to close a controllable switching device to share power (e.g., one of 106A or 106B), the controller 116 will disable interrupts, enter a tight loop, and send a response to the other power supply indicating that power supply module 200 is waiting for the other power supply module to close its switch to share power. Power supply module 200 monitors the voltage at the interface receiving the request (e.g., one of 106A, 106B). Upon detecting a change in the voltage at the interface, power supply module 200 closes its controllable switching device (e.g., 106A or 106B). Once the controllable switching device is closed, power supply module 200 and the other power supply are sharing power. The shared power is employed to provide power to powered devices coupled with the at least one powered port 102, and may also be employed to provide power to powered devices coupled with the other power supply module.

In an example embodiment, one power sharing interface (e.g. interface 104A) is coupled to a first power sharing group in a ring configuration (see, e.g., FIG. 4 for an example of a ring topology) and a second power sharing interface (e.g. interface 104B) is coupled with an expandable power supply (XPS) (for example a power sharing group coupled in a star topology where the power sharing interface of members of the group is coupled to a common bus or device). If power supply 200 is switching from the ring topology to a star topology, and is receiving power from another power supply module via power sharing interface 104A and either the power supply 202 is switched off or power supply module 200 does not have an internal power supply (similar to power supply module 100 in FIG. 1), the controllable switching device 106B is closed (so that apparatus 200 may receive power via the XPS network) before the controllable switching device 106A is opened. Similarly, if the apparatus 200 is switching from the XPS network to the ring network, the controllable switching device 106A is closed before the controllable switching device 106B is opened.

In an example embodiment, a power supply module may have additional interfaces for coupling with other devices such as peripherals or a central processing unit (CPU). For example, referring to FIG. 3, there is illustrated an example of a power supply module 300 with a power sharing interface (port) 114 and a second external interlace 302 capable of coupling the power supply with external peripherals or a central processing unit. In the example illustrated in FIG. 3, second external interface 302 is an I2C interface; however, interface 302 may be any suitable type of interface. Because group power processing may use significant resources of processor 116 (for example processor 116 may disable interrupts and enter a tight loop), to prevent a device or processor coupled with I2C interface 302 from considering apparatus 300 as unresponsive, processor 116 may disable I2C interface 302. Thus, signals sent to I2C 302 from an external peripheral or processor would receive a negative acknowledgement (NACK), as opposed to no response. In particular embodiments, I2C 302 is used for communicating with an Internetwork Operating System (IOS) and the controller 116 disables I2C interface 302 before entering one of a group consisting of the discovery state the power budget state, and a master declaration state.

Figure 4:
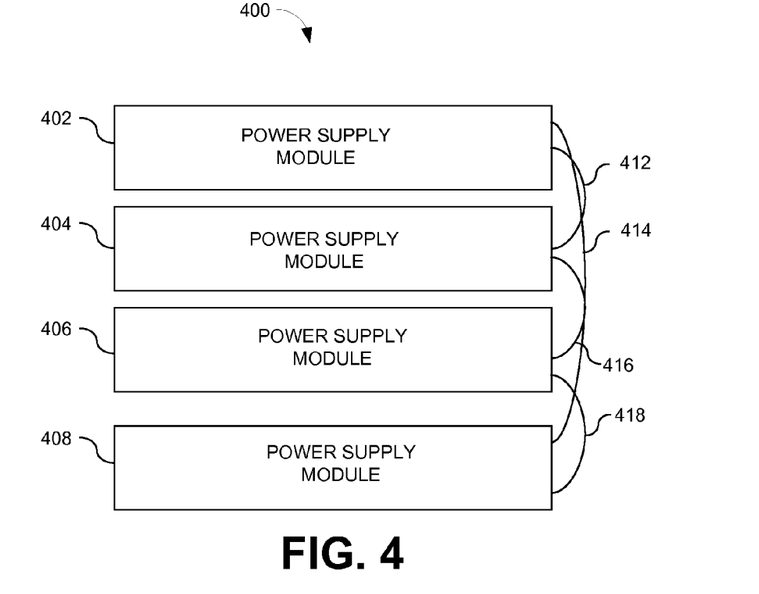
FIG. 4 is a block diagram illustrating an example of a power sharing group in a ring configuration.

FIG. 4 is a block diagram illustrating an example of power supply modules 402, 404, 406, 408 coupled in a ring configuration 400. In this example, power supply modules 402, 404, 406, 408 have two power sharing interfaces. Power supply module 402 is coupled with power supply module 404 via power sharing cable 412 and with power supply module 408 via power sharing cable 414. Power supply module 404 is coupled with power supply module 402 via power sharing cable 412 and is coupled with power supply module 406 via power sharing cable 416. Power supply module 406 is coupled with power supply module 404 via power sharing cable 414 and coupled with power supply module 408 via power sharing cable 418. Note that disconnecting any of power supply cables 412, 414, 416, 418 changes the topology to a half ring power sharing group.

In an example embodiment, each power supply module 402, 404, 406, 408 sends discovery messages. For example power supply module 402 sends a discovery message on cable 412 and 414; power supply module 404 sends a discovery message on cables 412 and 416, power supply module 406 sends discovery messages on cables 416 and 418; and power supply module 408 sends discovery messages on cables 414 and 418. Each power supply module 402, 404, 406, 408 listens for discovery messages from other power supply modules and waits to receive its own discovery message back. In an example embodiment, the sender of a discovery message sinks the message, other members of the group either forward the message on its other interface (in a ring topology such as is illustrated in FIG. 4) or if only one interface is coupled with other members of the power sharing group the message is sent back out the interface it was received from. Once a power supply module receives its message back it sets a timer and upon expiration of the timer, one of power supply modules 402, 404, 406, and 408 is selected as the master of the group. The master of the group may be pre-selected, for example by a user employing a command line interface or power supply modules 402, 404, 406, 408 may determine a master based on a predefined criteria such as the power supply module having the lowest (or highest) MAC address.

The master enters a master declaration state while the remaining power supply enter a power budget state. The master then determines a power budget for power supply module and sends a unicast message to each module with data representative of the power supply budget. The master also obtains (determines) its own power budget. The master then transitions to the power budget state. Each power supply module 402, 404, 406, 408 that has an internal power supply determines whether to switch on the internal power supply (if it has one) based on its power supply budget. Power supply modules 402, 404, 406, 408 connect their power sharing interfaces to their respective power sharing cables to share power. Power supply modules 402, 404, 406, 408 then transition to the ready state as described herein.

In an example embodiment, at least one of power supply modules 402, 404, 406, 408 has an internal power supply (for example as illustrated in FIG. 2). For example, if only power supply module 402 has an internal power supply, it would share (provide) power with modules 404, 406, 408. If more than one of power supply modules 402, 402, 406, 408 has an internal power supply, some power supplies may be turned off when not needed. For example, if power supply modules 402, 404, 406, and 408 all have internal power supplies, but only two power supplies are required to provide power so all of power supply modules 402, 404, 406, 408 and powered (e.g. POE or POE+) devices coupled with power supply modules 402, 404, 406, 408, then any two of power supply modules 402, 404, 406, 408 may share power with power supply modules 402, 404, 406, 408 while the other two power supply modules have their internal power supplies turned off. For example, power supply modules 402 and 404 may provide (share) power to all of power supply modules 402, 404, 406, 408, and the internal power supplies for power supply modules 406, 408 may be switched off.

If additional power is needed because of the addition of powered devices to any of power supply modules 402, 404, 406, 408, then one or both of the switched off internal power supplies (e.g., the internal power supplies of power supply modules 406, 408 in the preceding example) may be switched on as needed.

Similarly, if less power is required due to less consumption by powered devices (for example in the evening when powered devices may be turned off), then power supplies may be switched off as needed. For example, in the preceding example power supply modules 402, 404 were sharing (providing) power for the rest of the group. If less power (only one power supply) is required, then one of the internal power supplies of power supply modules 402, 404 can be switched off.

Although the example illustrated in FIG. 4 illustrated four power supply modules 402, 404, 406, 408, those skilled in the art should readily appreciate that any physically realizable number of power supply modules (two or more) may be employed to create a group power sharing system. Moreover, in accordance with an example embodiment, the internal power supplies of the power supply modules can have different capacities. As will be illustrated herein infra (see FIG. 7), power supply modules 402, 404, 406, 408 may advertise the capacity of their internal power supply (or supplies) in discovery or other messages.

Figure 3:
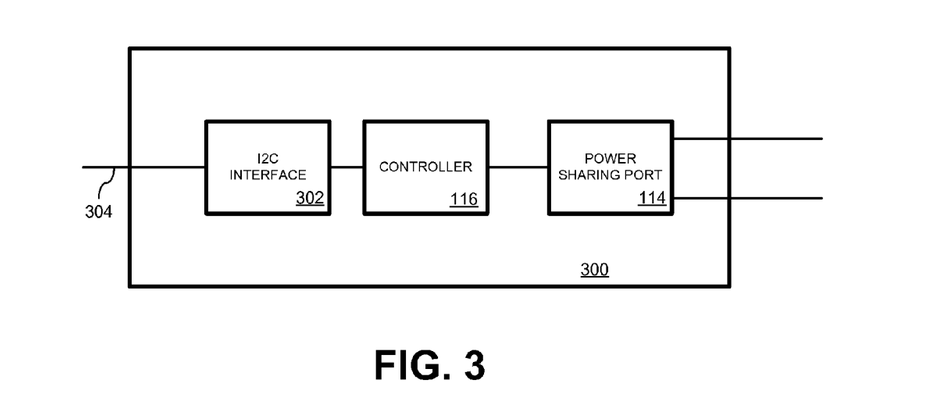
FIG. 3 is a block diagram illustrating an example of a power supply module for use with a power sharing group, the power supply module having a power sharing interface and a second external interface capable of coupling the power supply module with external devices such as peripherals or a central processing unit.
Figure 5:
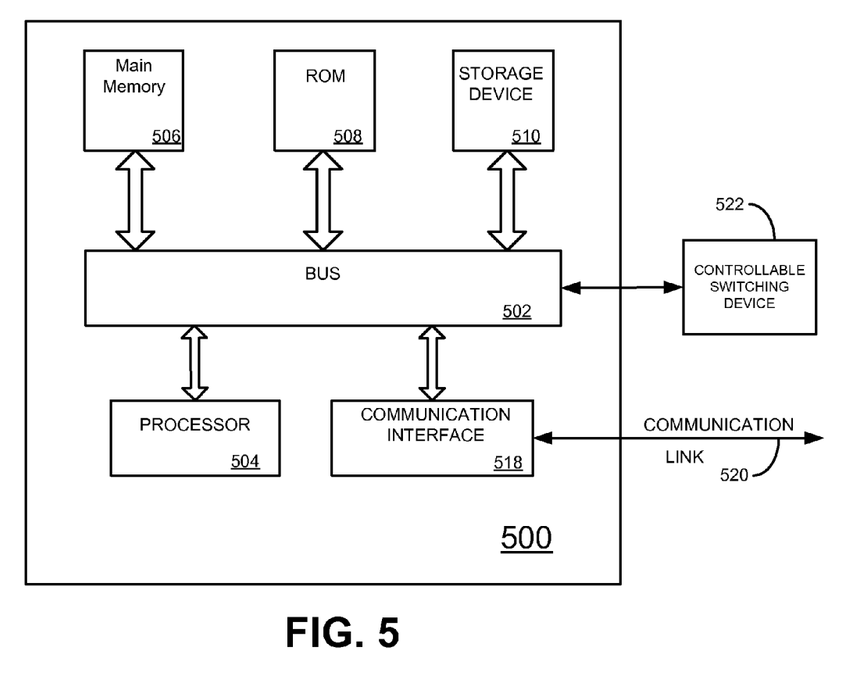
FIG. 5 is a block diagram illustrating an example of a computer system upon which an example embodiment can be implemented.

FIG. 5 is a block diagram that illustrates a computer system 500 upon which an example embodiment may be implemented. Computer system 500 may be employed to implement the controller 116 (FIGS. 1-3).

Computer system 500 includes a bus 502 or other communication mechanism for communicating information and a processor 504 coupled with bus 502 for processing information. Computer system 500 also includes a main memory 506, such as random access memory (RAM) or other dynamic storage device coupled to bus 502 for storing information and instructions to be executed by processor 504. Main memory 506 also may be used for storing a temporary variable or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

An aspect of the example embodiment is related to the use of computer system 500 for power sharing group formation. According to an example embodiment, power sharing group formation is provided by computer system 500 in response to processor 504 executing one or more sequences of one or more instructions contained in main memory 506. Such instructions may be read into main memory 506 from another computer-readable medium, such as storage device 510. Execution of the sequence of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 504 for execution. Such a medium may take many forms, including but not limited to non-volatile media, and volatile media. Non-volatile media include for example optical or magnetic disks, such as storage device 510. Volatile media include dynamic memory such as main memory 506. As used herein, tangible media may include volatile and non-volatile media. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 504 for execution. For example, the instructions may initially be borne on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506 from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling computer system 500 to a communication link 520 that is coupled with at least one other power supply module. This allows processor 504 to communicate with other power supply modules, for example to send/receive discovery, power master declaration and/or power budget messages.

Computer system 500 is also coupled with controllable switching device 522 such as a CSDS and/or BCSDS. This allows the power supply module associated with computer system 500 to share power with at least one power supply module.

Figure 6:
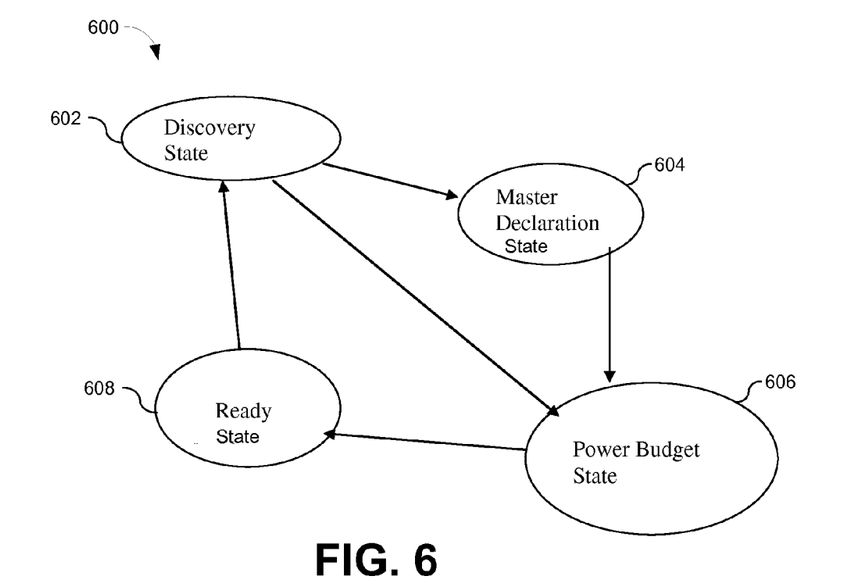
FIG. 6 illustrates an example of a state diagram for a power supply module.

FIG. 6 illustrates an example of a state diagram 600 for a power supply module. In the illustrated example there are four states, discovery state 602, master declaration state 604, power budget state 606, and ready state 608.

In the discovery state 602, switches (power supply modules) in a group send out a discovery message to neighboring switches. In an example embodiment, the discovery messages are sent through a Universal Asynchronous Receiver-Transmitter ("UART") interface's software communication bus. After receiving a response to the discovery message (or messages if there are multiple neighbors), the switch starts a timer (a discovery done timer) to allow the neighboring switches to determine whether there are any other members in the group. After the timer expires, members of the group determine the master of the group. In an example embodiment, the following criteria may be employed:

1. The switch with a default master configuration should be the master;
2. If there is an existing master, it remains the master; or
3. If no master, the switch with the lowest (or highest) Media Access Control ("MAC") address.

The master switch enters the master declaration state 604. The master enters this state and declares itself the master by turning its master bit ON. This will notify other switches in the group which switch is the power sharing group master. The master will exit the master declaration state after sending and receiving two messages (one message would be sent out from each UART interface). If in the master declaration state, a switch joins the group that has a lower MAC address than the master (hence has a higher priority to be a master) then the master will yield and let the new switch declare itself the master. The old master will yield by turning OFF the master bit in the next group message. Moreover, if there is a group merge then the new master will also enter the master declaration state.

When the master leaves the master declaration state and enters the "power budget state" 606, and it will force other switches in the power sharing group to enter the power budget state 606 as well. In power budget state 606 the power sharing group master will also grant the power budget to the individual switches. In an example embodiment, when a group power application gets the power budget then it will set the group power interrupt bit so that group power application on the IOS can get the power budget and the master's MAC address.

After receiving the power budget, switches in the group (including the master) attempt to close their open controllable switching devices (for example Field Effect Transistors or "FETS") coupled with their neighbor switches to start sharing power. If the budget for a switching unit is greater than or equal to a minimum required power, the group power process would also power up the switching unit.

In the ready state 608, switches can continually monitor for certain events. In an example embodiment, switches monitor for the removal and/or insertion of powered devices to either adjust the power budget of individual switches and/or to inform the master that a power supply has been added or removed. In an example embodiment, switches monitor for the insertion and/or removal of power sharing cables. In particular embodiments, the insertion and/or removal of a power sharing cable triggers the system to return to the discovery state 602 and repeat the master selection process. In an example embodiment, switches send out keep alive (or heartbeat) messages to notify other switches in the group that the group power sharing process is running while in ready state 608.

Figure 7:
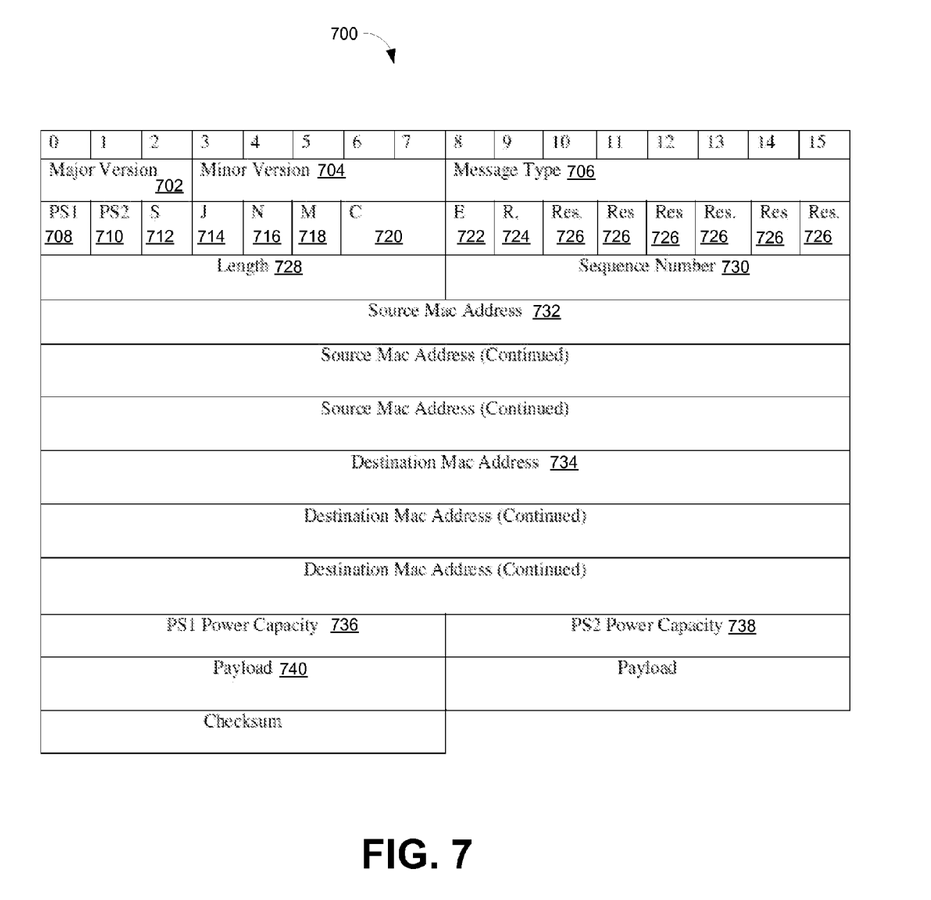
FIG. 7 illustrates an example message format for exchanging data between power supply modules.

FIG. 7 illustrates an example message format 700 for exchanging data between group power supply modules. The fields of example message format 700 will now be explained.

The major version field 702 is used to determine the compatibility of power sharing group protocol running on the power supply modules connected together to form a power sharing group. In an example embodiment, if the major version is different, the power supply modules may not be allowed to form a group.

The minor version 704 is also used to determine the compatibility of power sharing group protocol running on the power supply modules connected together but different minor versions would not be a hindrance in forming a power sharing group. It should also be noted that the minor version may be used to elect the master. For example, the switch with the more recent minor version will be elected as a master.

The message type field 706 is used to differentiate between different message types. In an example embodiment, the following message types are defined for the power sharing group protocol:

Neighbor Discovery Message (0x1)

This message is used during the group discovery and master election process.

Budget Assignment Message (0x2)

This message is used by the master to assign power budget to individual switches. The master will also advertise its own power budget with this message.

Budgeted Power (0x3)

This message is used by slave switches to advertise the power already allocated to its switch and the POE devices connected to it. Moreover, the budgeted power is different from the allocated power as allocated power is the budget assigned to a slave switch by the master.

Budget Request Message (0x4)

This message is used by the slave switches to ask for more power budget from the master.

Priority Message (0x5)

This message is used by switches in the group to advertise the priority assigned by the user to low priority POE, high priority POE and the switch itself. The first five bits of the payload message will contain the system priority, the next five bits will be reserved for high priority POE and the next five bits will be reserved for low priority POE devices.

Configuration Change (0x6)

This message is used by switches in the group to advertise the change in configuration. The change in configuration can be determined by looking at the flags in the $3^{rd}$ and $4^{th}$ bytes. The change in configuration is advertised when either a power supply is added or removed.

Invalid Configuration (0x7)

This message is sent by the master to the neighbor of the switch that it wants to remove from the group. The neighbor of the switch with either an invalid configuration an extra switch that could provide more power than the power sharing group can hadle. This message would shut down the software communication bus of the UART interface connected to that switch.

Keep Alive Messages (0x8)

This message will be sent out by switches in the group to inform other switches in the group that the switch is alive.

The first power supply present ("PS1") field 708 is used to determine whether a power supply is present in a first slot of a power supply module. The second power supply present ("PS2") field 710 is used to determine whether a power supply is present in a second slot of a power supply module.

The stackable ("S") field 712 is used by power supply modules to advertise whether they can be made part of a power sharing group or not. The Jack-Jack ("J") field 714 is used to determine whether the switch is connected to an expandable power supply ("XPS" or "Jack-Jack") or another power sharing switch in a star topology. Jack-Jack field 714 is set by the Jack-Jack or the other device, not by the power supply module sending the message.

The Neighbor ("N") 716 field is used to determine the neighbors of a power supply module. The bit will be set by the power supply module before sending a discovery message. A power supply module upon receiving this message will reset this bit before forwarding it out another UART interface. For example referring to FIG. 2 with continued reference to FIG. 7, if a message is received on the communication interface 114A, the neighbor bit will be reset before forwarding the message on the communication interface 114B.

The Master ("M") field 718 is used to determine whether the power supply module sending the message is a master or a slave. Master field 718 is set by the master during the master declaration state.

Configuration ("C") field 720 is used to determine whether the group is operating in power sharing or redundant mode. If the field is set to (00b) then the group is in power sharing mode and if it is set to (01b) then it would be assumed that the group is in redundant mode. The default mode is the power sharing mode. Moreover, a user can set the switch to operate in standalone mode but in that case the switch will shut down both the software communication buses (for example interfaces 110A and 110B in FIG. 2).

End of the ring switch ("E") field 722 is used by a power supply module that is at the end of a half ring power sharing group. For example a power supply module that has only one UART interface connected to another switch.

Switch Removed ("R") field 724 is used by a neighbor of a switch that was removed from a group. The neighboring switch will set switch removal field 724 and send a discovery message out of its other UART interface. For example, referring to FIG. 2 with continued reference to FIG. 7, if a power supply module coupled to the communication interface 114A (a UART in this example) is removed, the controller 116 will send a discovery message with switch removal field 724 set via the second communication interface 114B (or a second UART in this example).

Reserved bits 726 are 1 bit flags that are not used in the example embodiment illustrated, but reserved bits 726 might be reserved for future use.

Length field 728 specifies the length of the packet. The sequence number field 730 is used to make sure that the power supply module is not getting duplicate messages. In an example embodiment, only the power supply module sending a message or the master can remove a message from the ring. If the power supply module sending the message fails, the message may be continually forwarded on the ring. The sequence number field will prevent the remaining power supply modules on the ring from continually processing the messages.

The source MAC address field 732 will be populated by the power supply module sending out the packet with its own distinct MAC address. In an example embodiment, although a MAC address is 48 bits long, it can be condensed to a 40 bits long distinct MAC address.

The destination MAC address field 734 will be populated by the power supply module sending out the packet with a distinct MAC address of the intended recipient of the message. In an example embodiment, although the MAC address is 48 bits long, it can be condensed to a 40 bits long distinct MAC address.

The capacity of the first power supply (PS1 Power Supply) 736 is used to advertise the type of the power supply in a first slot of a power supply module. The type of power supply will help the other switches determine the power capacity of the power supply.

The capacity of the second power supply (PS2) 738 is used to advertise the type of the power supply in a second slot of a power supply module. The type of power supply will help the other switches determine the power capacity of the power supply.

The contents of Payload field 740 are dictated by the message type. Table 1 below describes the data that will populate the payload field based on the message type.

TABLE 1

Group Power Sharing Payload Description

| Message Type | Payload ($1^{st}$ byte) | Payload ($2^{nd}$ Byte) |
| --- | --- | --- |
| Group Discovery Message | Minimum Power Requirement | Maximum Power Requirement |
| Budget Assignment Message | Power allocated by the master to an individual switch | |
| Budgeted Power | Power budgeted to the POE devices connected to the switch. | |
| Budget Request Message | Power increase request by individual switch to the master | |
| Priority Message | Switch Priority | High Priority POE    Low Priority POE |
| Configuration Change | N/A | |
| Invalid Configuration | N/A | |
| Keep Alive Message | Power budgeted to the POE devices connected to the switch. | |

Figure 8:
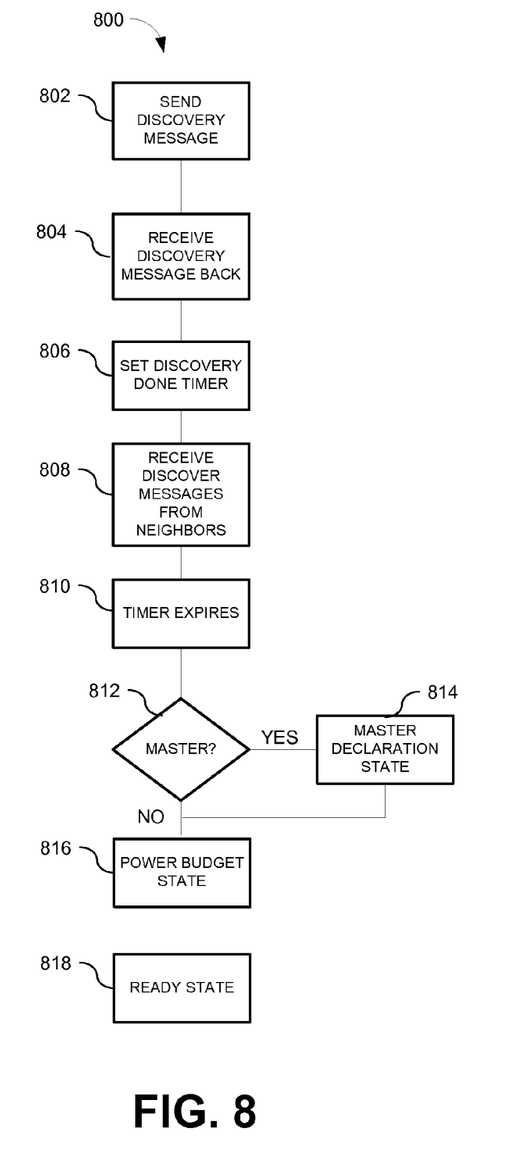
FIG. 8 illustrates an example methodology for power sharing group formation.
Figure 9:
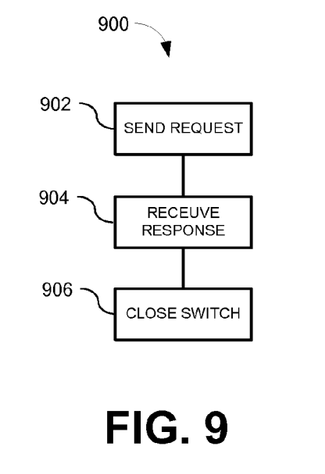
FIG. 9 illustrates a methodology for initiating the closing of switches to implement power sharing.
Figure 10:
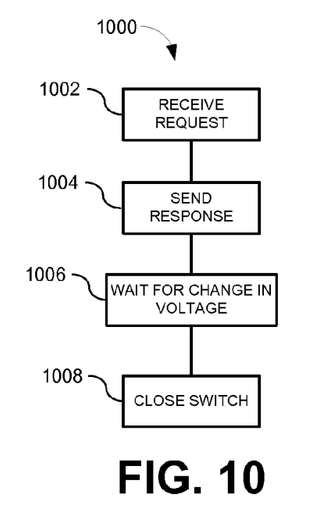
FIG. 10 illustrates a methodology for responding to a request to close switches to implement power sharing.

In view of the foregoing structural and functional features described above, methodologies in accordance with an example embodiments will be better appreciated with reference to FIGS. 8-10. While, for purposes of simplicity of explanation, methodologies of FIGS. 8-10 are shown and described as executing serially, it is to be understood and appreciated that the example embodiment is not limited by the illustrated order, as some aspects could occur in different orders and/or concurrently with other aspects from that shown and described herein. Moreover, not all illustrated features may be required to implement an example embodiment.

Referring to FIG. 8, there is illustrated a methodology 800 for power sharing group formation. Methodology 800 is described suitably adapted to be implemented in hardware, software, or a combination thereof, such as a processor executing software. Methodology 800 may be performed by controller 116 (FIG. 1-3) and/or processor 504 (FIG. 5).

At 802, a switch (or power supply module within a switch) in a group sends out a discovery message to its neighboring switches. In an example embodiment, the discovery messages are sent through a Universal Asynchronous Receiver-Transmitter ("UART") interface's software communication bus.

At 804, a switch will receive the discovery message sent at 802. After receiving the discovery message, at 806 the switch starts a timer (e.g., a discovery done timer) to allow the neighboring switches to obtain data about other members in the group as illustrated at 808. After the timer expires at 810, members of the group determine the master of the group as illustrated at 812. In an example embodiment, the following criteria may be employed:

1. The switch with a default master configuration should be the master;
2. If there is an existing master, it remains the master; or
3. If no master, the switch with the lowest (or highest) Media Access Control ("MAC") address.

If the switch is the master switch (YES), The switch enters the master declaration state at 814, the remaining switch or switches (NO) wait for the master declaration message from the master before entering the power budget state at 816.

In the master declaration state at 814, the master will declare itself as a master by sending out a master declaration message. After ensuring the master declaration has been delivered to members of the group, the master will then calculate the power budget for members in the group and sends out a unicast power budget message to switches in the group. If the individual priorities are not configured, the master will also calculate High Priority Power over Ethernet ("POE"), lower priority POE, and system priorities based on the MAC addresses of members in the group. After sending out power budget message to the member switches, the master will transition to the ready state.

After receiving the power budget, switches in the group attempt to close their open controllable switching devices (for example Field Effect Transistors or "FETS") coupled with their neighbor switches to start sharing power. If the budget for a switching unit is greater than or equal to a minimum required power, the process would also power up the switching unit.

Once the controllable switching devices are closed, the switches enter the ready state at 818. In the ready state, switches continually monitor for certain events. In an example embodiment, switches monitor for the removal and/or insertion of power supplies to either adjust the power budget of individual switches and/or to inform the master that a power supply has been added or removed. In an example embodiment, switches monitor for the insertion and/or removal of power sharing cables. In particular embodiments, the insertion and/or removal of a power sharing cable trigger the group to return to the discovery state and repeat the master selection process. In an example embodiment, switches send out keep alive (or heartbeat) messages to inform members of the group that the group power sharing process is running.

FIG. 9 illustrates a methodology 900 for initiating the closing of switches to implement power sharing between power supply modules. Methodology 900 is described suitably adapted to be implemented in hardware, software, or a combination thereof, such as a processor executing software. Methodology 900 may be performed by controller 116 (FIG. 1-3) and/or processor 504 (FIG. 5).

At 902, the initiator sends a request message to a power supply module coupled with a powering sharing interface "the responder"). The request message comprises data indicating that the initiator wishes to close the controllable switching device (such as a CSDS, BCSDS, and/or FET) to share power.

The initiator waits for a response message from the responder. At 904 the response is received. The response message comprises data indicating that the responder is waiting for the initiator to close its controllable switching device.

At 906, in response to receiving the response message at 904, the initiator closes its controllable switching device. Once, the controllable switching device is closed, the initiator is now ready to share power with other members of the power sharing group.

FIG. 10 illustrates a methodology 1000 for responding to request to close switches to implement power sharing between power supply modules. Methodology 1000 is described suitably adapted to be implemented in hardware, software, or a combination thereof, such as a processor executing software. Methodology 1000 may be performed by controller 116 (FIG. 1-3) and/or processor 504 (FIG. 5).

At 1002, a request message is received (by a "responder") from the power supply module coupled with a power sharing interface ("the initiator"). The request message comprises data indicating that the initiator is ready to share power.

At 1004, a message is sent to the initiator. The message comprises data indicating that the responder is ready for the initiator to close its controllable switching device (such as a CSDS, BCSDS, and/or FET) to share power.

The responder then waits as indicated at 1006 for a voltage change. The voltage at the power sharing interface changes in response to the initiator closing its controllable switching device.

Upon detecting the voltage change, the responder closes its controllable switching device as indicated at 1008. Power sharing begins once the responder closes its controllable switching device.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
    at least one powered port configured to provide power to a powered device;
    a data interface for communicating with at least one other power supply module;
    a power sharing interface for sharing power with the at least one other power supply module, the power sharing interface comprising a controllable switching device;
    a controller coupled with the data interface and power sharing interface;
    wherein the controller sends and receives discovery messages with the at least one other power supply via the data interface;
    wherein the controller obtains data representative of a power budget; and
    wherein the controller closes the controllable switching device in the power sharing interface to share power with the at least one other power supply module.

2. The apparatus set forth in claim 1, wherein the controller enters a master declaration state based on data obtained from the discovery messages, wherein the controller sends a master declaration to the at least one other power supply via the data interface.

3. The apparatus set forth in claim 2, wherein the controller calculates a power budget for each of the at least one power supply module; and
    wherein the controller sends a unicast power budget message to each of the at least one power supply module.

4. The apparatus set forth in claim 3, wherein the controller determines low priority and high priority powered ports for the at least one powered port and the at least one powered port associated with the at least one other power supply.

5. The apparatus set forth in claim 1, wherein the controllable switching device is responsive to receiving a signal from the controller to close the switch to:
    send a request message to a power supply module coupled with the power sharing interface, the request message containing data indicating that the controllable switching device is ready to close;
    wait for a response message from the power supply module coupled with the power sharing interface, the response message comprising data indicating that the power supply module coupled with the power shared interface is waiting for controllable switching device to close; and
    closing the controllable switching device responsive to receiving the response message.

6. The apparatus set forth in claim 5, further comprising an inter-integrated communication (I2C) interface for communicating with an Internetwork Operating System (IOS);
    wherein the controller disables the I2C interface before entering one of a group consisting of the discovery state the power budget state, and a master declaration state.

7. The apparatus set forth in claim 1, wherein the controllable switching device is responsive to receiving a signal from a power supply module coupled with the power shared interface containing data indicating that the controllable switching device coupled to the power shared interface is about to close to send a message to the power supply module coupled with the power shared interface, the message comprising data indicating that the power supply module coupled with the power shared interface is waiting for controllable switching device to close;
    detecting a change of voltage at the power shared interface; and
    closing the controllable switching device responsive to detecting the change in voltage.

8. The apparatus set forth in claim 1, wherein while in the ready state the controller monitors for one of removal and insertion of a power supply module; and
    the controller performs one of adjusting a power budget and communicating detection of insertion or removal of a power supply module to a master power supply module responsive to detecting one of removal and insertion of a power supply module.

9. The apparatus set forth in claim 1, wherein while in the ready state the controller monitors for one of insertion and removal of a power sharing cable; and
    wherein the controller returns to the discovery state responsive to detecting one of an insertion and removal of a power sharing cable.

10. The apparatus set forth in claim 1, further comprising an internal power supply, wherein power from the power supply is shared with the at least one other power supply module via the power sharing interface while the controllable switching device is closed.

11. The apparatus set forth in claim 10, further comprising:
a second power sharing interface for sharing power with a second power supply module, the second power sharing interface comprising a second controllable switching device; and
a second data interface for communicating with the second power supply module;
wherein the controller is coupled with the second power sharing interface and second data interface;
wherein the controller sends and receives discovery messages from power from the second at least one other power supply module while in the discovery state via the second data interface;
wherein the controller switches the second controllable switching device to the closed state responsive to obtaining the power budget; and
wherein power from the power supply is shared with the second power supply module via the second power sharing interface while the controllable switching device is closed.

12. The apparatus set forth in claim 11, wherein a first universal asynchronous receive/transmit (UART) is employed to implement the first power sharing interface and first data interface; and
wherein a second UART is employed to implement the second power sharing interface and second data interface.

13. The apparatus set forth in claim 1, further comprising:
a second data interface configured for communicating with a second power supply module coupled with an expandable power supply (XPS);
a second power sharing interface configured for sharing power with the second power supply module, the second power sharing interface comprising a second controllable switching device;
wherein the controller is coupled with the second data interface and second power sharing interface;
wherein the at least one powered port receives power from the at least one power supply module coupled with the first power sharing interface;
wherein the controller in response to deciding to switch to the XPS closes the second controllable switching device before opening the first controllable switching device.

14. A method, comprising
sending a discovery message;
receiving the discovery message;
receiving a discovery message from at least one other power supply module;
determining whether to enter a master declaration state;
obtaining a power budget; and,
closing a controllable switching device coupled with a first power sharing interface to share power with at least one other power supply module responsive to obtaining the power budget.

15. The method of claim 14, further comprising:
setting a time to a predefined time period responsive to receiving the discovery message; and
waiting for the timer to expire before determining whether to enter a master declaration state.

16. The method according to claim 15, wherein determining whether to enter a master declaration state is based on a lowest media access control (MAC) address.

17. The method according to claim 15, further comprising sending a master declaration message responsive to entering a master declaration state.

18. The method according to claim 15, further comprising powering up a switching unit responsive to receiving a power budget that is at least a minimum required power.

19. The method according to claim 14, further comprising adjusting a power budget for the at least one other power supply module responsive to detecting an insertion of a power supply module.

20. Logic encoded in a non-transitory computer readable storage medium for execution by a processor, and when executed operable to:
send a discovery message;
receive the discovery message;
receive a discovery message from at least one other power supply module;
determine whether to enter a master declaration state;
obtain a power budget; and,
close a controllable switching device coupled with a first power sharing interface to share power with at least one other power supply module responsive to obtaining the power budget.

21. The logic set forth in claim 20, wherein a plurality of discovery messages are sent on a plurality of interfaces.

22. The logic set forth in claim 20, further operable to disable an inter-integrated communications (I2C) interface prior to sending the discovery message.

23. The logic set forth in claim 22 further operable to disable interrupts after disabling the I2C interface.

24. The logic set forth in claim 20, wherein closing the controllable switching device comprises:
sending a request message to a power supply module coupled with the power sharing interface with data indicating that the controllable switching device is ready to be closed;
receiving a response to the request; and
closing the controllable switching device responsive to receiving the response.

25. The logic set forth in claim 20, wherein closing of the controllable switching device comprises:
receiving a message indicating a power supply module coupled with the power sharing interface is ready to share power;
sending a response to the message;
waiting for a voltage change at the power sharing interface; and
closing the controllable switching device responsive to detecting the voltage change.

* * * * *